(12) United States Patent
Xu et al.

(10) Patent No.: US 10,704,633 B2
(45) Date of Patent: Jul. 7, 2020

(54) MULTILAYER WIND SPRING FOR A DISPLAY SUPPORT AND LIFTING SUPPORT THEREOF

(71) Applicant: STRONKIN ELECTRONICS CO., LTD, Jiangsu (CN)

(72) Inventors: Xiangyu Xu, Jiangsu (CN); Bo Qu, Jiangsu (CN)

(73) Assignee: STRONKIN ELECTRONICS CO., LTD, Jiangsu (CN)

( * ) Notice: Subject to any disclaimer, the term of this patent is extended or adjusted under 35 U.S.C. 154(b) by 0 days.

(21) Appl. No.: 16/082,076

(22) PCT Filed: Sep. 4, 2017

(86) PCT No.: PCT/CN2017/100405
§ 371 (c)(1),
(2) Date: Sep. 4, 2018

(87) PCT Pub. No.: WO2019/006847
PCT Pub. Date: Jan. 10, 2019

(65) Prior Publication Data
US 2019/0383342 A1    Dec. 19, 2019

(30) Foreign Application Priority Data
Jul. 7, 2017   (CN) .......................... 2017 1 0550795

(51) Int. Cl.
*F16F 1/10*   (2006.01)
*F16F 1/12*   (2006.01)
*F16M 11/24*  (2006.01)

(52) U.S. Cl.
CPC ................ *F16F 1/10* (2013.01); *F16F 1/123* (2013.01); *F16M 11/24* (2013.01); *F16M 2200/04* (2013.01)

(58) Field of Classification Search
CPC combination set(s) only.
See application file for complete search history.

(56) References Cited

U.S. PATENT DOCUMENTS 5,157,825 A * 10/1992 Kasahara .............. F16F 15/073
                                                   264/252
6,227,508 B1 * 5/2001 Panzarella ......... A47B 21/0314
                                                   248/118.3

(Continued)

FOREIGN PATENT DOCUMENTS

CN          1575113 A      2/2005
CN        104390105 A      3/2015

(Continued)

OTHER PUBLICATIONS

International Search Report and Written Opinion dated Apr. 9, 2018 by the International Searching Authority for International Application No. PCT/CN2017/100405, filed on Sep. 4, 2017 (Applicant—Stronkin Electronics Co., Ltd)(Original—8 Pages // Translation—6 pages).

*Primary Examiner* — Monica E Millner
(74) *Attorney, Agent, or Firm* — Ballard Spahr LLP

(57) ABSTRACT

A multilayer wind spring for a display support and a lifting support thereof, the multilayer wind spring is formed by tightly attaching and winding multiple elastic metal sheets, each of the elastic metal sheets comprises: a stretching connection portion which is not involved in winding and unwinding and is always kept in an initial state, a movable sheet portion which is involved in winding and unwinding, and an unmovable wound portion which is not involved in stretching and is always kept in a wound state, the stretching connection portion, the movable sheet portion, and the unmovable wound portion are formed integrally and sequentially arranged in an unwinding direction, and the elastic (Continued)

metal sheets of the unmovable wound portions are arranged fixedly relative to one another.

12 Claims, 6 Drawing Sheets

(56) References Cited

U.S. PATENT DOCUMENTS

| | | | |
|---|---|---|---|
| 7,611,103 B2 | 11/2009 | Sang-Kyeong et al. | |
| 7,764,491 B2 * | 7/2010 | Zhao | F16M 11/10 361/679.22 |
| 7,789,355 B2 | 9/2010 | Wen-Lin | |
| 7,874,530 B2 * | 1/2011 | Kim | F16M 11/046 248/123.11 |
| 7,876,392 B2 * | 1/2011 | Shen | F16M 11/105 248/146 |
| 2007/0045488 A1 * | 3/2007 | Shin | F16M 11/105 248/176.1 |
| 2007/0205340 A1 * | 9/2007 | Jung | F16M 11/24 248/125.9 |
| 2009/0184224 A1 * | 7/2009 | Gan | F16M 11/105 248/283.1 |
| 2011/0278424 A1 * | 11/2011 | Theis | F16M 11/18 248/608 |
| 2011/0297801 A1 * | 12/2011 | Su | F16M 11/10 248/161 |
| 2016/0038677 A1 * | 2/2016 | Kiilerich | A61M 5/31553 604/211 |
| 2017/0219158 A1 * | 8/2017 | Chin | F16M 11/22 |

FOREIGN PATENT DOCUMENTS

| | | |
|---|---|---|
| CN | 206072672 U | 4/2017 |
| CN | 201710550795.7 | 7/2017 |
| WO | PCT/CN2017/100405 | 9/2017 |

* cited by examiner

MULTILAYER WIND SPRING FOR A DISPLAY SUPPORT AND LIFTING SUPPORT THEREOF

CROSS-REFERENCE TO RELATED APPLICATIONS

This application is a U.S. National Phase Application of International Application No. PCT/CN2017/100405, filed Sep. 4, 2017, which claims priority to Chinese Application No. 201710550795.7, filed Jul. 7, 2017, each of which are hereby incorporated by reference in their entirety.

TECHNICAL FIELD

The present disclosure relates to the technical field of coil spring, and in particular to a multilayer wind spring for a display support and a lifting support thereof.

BACKGROUND ART

At present, a display screen is usually supported by a lifting support, the lifting support comprises a stand column and a lifting seat, and the display screen is disposed on the stand column via the lifting seat with its height being adjustable.

A constant force spring (a type of wind spring) is disposed between the stand column and the lifting seat, and arbitrary stopping of the display screen during the adjustment of its height can be achieved by means of the constant force spring.

In order to meet the requirement of ultra-thinning development of stand column, those skilled in the art have attempted to replace the existing single-layer constant force spring with a multilayer wind spring, so as to effectively reduce the space occupied by the constant force spring in the stand column, thereby meeting the requirement of ultra-thinning of the stand column.

However, the multilayer wind spring has very short service life. An arching phenomenon of an inner-layer metal sheet frequently occurs during its use. Once the inner-layer metal sheet arches, the multilayer wind spring can no longer be used normally and has to be replaced, thereby resulting in bad user experience while increasing the maintenance cost.

In the prior art, it is necessary to apply a lubricating oil between two adjacent elastic metal sheets, so as to avoid the arching phenomenon to the greatest extent for a long period of time during the use of the multilayer wind spring. The process of manufacturing the multilayer wind spring comprises making elastic metal sheets by rolling forming and heat treatment, and finally combining the multiple elastic metal sheets into a multilayer wind spring by a spring-combining (making) machine. Since the applied lubricating oil is washed away during the heat treatment, the lubricating oil must be applied during the spring-combining process. However, since the elastic metal sheets have all been formed by pressing at this moment, the oil application procedure is complicated with low efficiency.

SUMMARY OF THE DISCLOSURE

An object of the present disclosure is to provide a multilayer wind spring for a display support, so as to solve the technical problem existing in the prior art that the multilayer wind spring has very short service life and the arching phenomenon of inner-layer metal sheet frequently occurs during its use, and to solve the problem that it is necessary to apply a lubricating oil between two adjacent elastic metal sheets and the oil application procedure is complicated with low efficiency.

Another object of the present disclosure is to provide a lifting support having the above-mentioned multilayer wind spring for a display support, which is ultra-thinner and has longer service life and lower maintenance cost compared with those in the prior art.

In order to solve the above technical problems, the present disclosure provides a multilayer wind spring, which is formed by tightly attaching and winding multiple elastic metal sheets, each of the elastic metal sheet comprises: a stretching connection portion which is not involved in winding and unwinding and is always kept in an initial state (the stretching connection portion is an outwardly extending portion of an outermost layer or an outermost turn of the wound portion of the elastic metal sheet after the multilayer wind spring is wound up to an extreme position), a movable sheet portion which is involved in winding and unwinding, and an unmovable wound portion which is not involved in stretching and is always kept in a wound state (the unmovable wound portion is usually wound for not less than one turn, and for less than one turn in particular situations), the stretching connection portion, the movable sheet portion, and the unmovable wound portion are formed integrally and sequentially arranged in an unwinding direction, on the unmovable wound portions, all the elastic metal sheets are fixedly arranged relative to one another.

During use of a multi-sheet type wind spring formed by stacking and winding multiple elastic metal sheets together, the arching phenomenon of the elastic metal sheet frequently occurs. Those skilled in the art have been plagued by this technical problem for many years.

The applicant has discovered through long-term study that the reason of arching is the dislocation between the elastic metal sheets during the unwinding process, and when the elastic metal sheets are wound up, the wound shape of the wound portion severely hinders the elastic metal sheets from returning to the state before dislocation, so that the arched wind spring cannot be normally used.

In the present disclosure, the unmovable wound portions of the multiple elastic metal sheets are fixedly arranged relative to one another, so as to effectively avoid dislocation between the elastic metal sheets of the winding reel portion of the multilayer wind spring, thereby effectively solving the arching phenomenon of the wind spring, and thereby greatly prolonging the service life of the multilayer wind spring, which makes it possible to popularize and apply the multilayer wind spring.

Further, the elastic metal sheet comprises a wound end at the side of the unmovable wound portion, and the wound ends of two adjacent elastic metal sheets are fixed relative to each other.

Further, the wind spring is formed by tightly attaching and winding 2 to 7 elastic metal sheets.

Further, the wind spring is formed by tightly attaching and winding 2 to 3 elastic metal sheets together.

Further, the unmovable wound portion is wound for 3 to 10 turns.

Further, the elastic metal sheets of the unmovable unwound portions are fixedly connected together by means of a rivet, a screw, a buckle, a pin, a mortise-tenon structure, bundling, welding or bonding.

Further, a through hole is provided in the middle of the unmovable wound portion, a rotary drum is inserted into the through hole, the rotary drum is rotatably sleeved on a rotating shaft, and the unmovable wound portion of the elastic metal sheet is fixedly connected with the rotary drum.

Specifically, the unmovable wound portion of the elastic metal sheet is fixedly connected to the rotary drum by means of a screw, a pin, a rivet or the like. The winding reel portion of the multilayer wind spring is rotatably disposed on the rotating shaft via the rotary drum, and the rotating shaft is then disposed across a connected component such as a holder, a support or the like.

Further, no lubricating oil is applied between two adjacent elastic metal sheets.

In the prior art, it is necessary to apply lubricating oil between two adjacent elastic metal sheets, so as to avoid the arching phenomenon to the greatest extent for a long period of time during the use of the multilayer wind spring. The process of manufacturing the multilayer wind spring comprises making elastic metal sheets by roll forming and heat treatment, and finally combining the multiple elastic metal sheets into a multilayer wind spring by a spring-combining machine. Since the applied lubricating oil is washed away during the heat treatment, the lubricating oil must be applied during the spring-combining process. However, since the elastic metal sheets have all been formed by pressing at this moment, the oil application procedure is complicated with low efficiency.

In contrast, in the present disclosure, the occurrence of the arching phenomenon is effectively avoided by the arrangement described above, whereby it is possible that no lubricating oil is applied between the elastic metal sheets. Accordingly, the multiple elastic metal sheets can be stacked together and simultaneously subjected to rolling forming and heat treatment, which no longer requires the spring-combining procedure while omitting the complicated oil application procedure, thereby greatly improving the production efficiency.

Further, the elastic metal sheet is a metal sheet having uniform thickness and consistent width for making a constant force spring.

Further, the stretching connection portion is provided with a semi-restricted structure used for connection with a connected component, some or all of the elastic metal sheets are provided with the semi-restricted structures, and the semi-restricted structure is provided to have a movement allowance in an unwinding or winding-up direction of the elastic metal sheets, and during an unwinding or winding process of the multilayer wind spring, the stretching connection portion of the elastic metal sheet provided with the semi-restricted structure is arranged to be slidable within the range of the movement allowance relative to the connected component.

Further, a fastening connector for connecting the stretching connection portion to the connected component is inserted into the semi-restricted structure, and the fastening connector and the semi-restricted structure are provided to have the movement allowance therebetween, wherein the fastening connector does not completely press and lock the stretching connection portion, and the stretching connection portion is arranged to be slidable relative to the fastening connector.

Further, the semi-restricted structure is an elongated hole or an elongated slot or a round hole, and the elongated hole or the elongated slot has its length direction arranged in the unwinding or winding-up direction of the elastic metal sheet. The fastening connector is a screw, a bolt, a pin, a hook, a rivet, or the like. Further, the multiple elastic metal sheets are divided into an outer-layer elastic metal sheet disposed at the outermost side and an inner-layer elastic metal sheet wrapped by the outer-layer elastic metal sheet, the inner-layer elastic metal sheet is provided with the semi-restricted structure, and the stretching connection portion of the outer-layer elastic metal sheet is fixedly connected with the connected component.

Preferably, the elongated hole is an obround kidney-shaped hole.

A long strip shaped, elongated hole or elongated slot, or a U-shaped opening is provided on the stretching connection portion of the elastic metal sheet and is disposed in the unwinding direction of the elastic metal sheet, so that when a certain elastic metal sheet tends to arch due to dislocation during use, the stretching connection portion of this elastic metal sheet freely stretches and retracts via the elongated hole, the elongated slot or the U-shaped opening, so as to eliminate the stress that causes arching of the elastic metal sheet, and prevent the elastic metal sheet from arching, thereby further ensuring the service life of the multilayer wind spring.

With the technical solutions described above, the present disclosure has the following beneficial effects:

A multilayer wind spring provided by the present disclosure has a simple structure and provides a stronger supporting force, and the present disclosure occupies smaller space while providing the same supporting force. In the present disclosure, the plurality of elastic metal sheets are fixedly connected to one other at corresponding parts of the unmovable wound portions, so as to effectively avoid dislocation between the plurality of elastic metal sheets of the winding reel portion of the wind spring, thereby effectively solving the arching phenomenon of the wind spring, and thereby greatly prolonging the service life of the multilayer wind spring, which makes it possible to popularize and apply the multilayer wind spring.

In addition, the present disclosure also discloses a lifting support having the above-mentioned multilayer wind spring for a display support, which comprises a stand column and a lifting seat, wherein the lifting seat is disposed on the stand column in such a manner that it is slidable up and down, the stretching connection portion of the multilayer wind spring is connected to the lifting seat or the stand column, the unmovable wound portion of the multilayer wind spring is rotatably disposed on the stand column or the lifting seat, and the multilayer wind spring tends to force the lifting seat to move upwards, thereby providing a supporting force for supporting the lifting seat.

Further, the stretching connection portion of the elastic metal sheet provided with the semi-restricted structure is arranged to be slidable within the range of the movement allowance relative to the lifting seat or the stand column.

Further, the unmovable wound portion of the multilayer wind spring is rotatably disposed on the stand column or the lifting seat via a rotary drum or a semi-wrapped spring base for constant force spring.

Further, the lifting support is a display screen support, and a display screen is disposed on the lifting seat.

By using a multilayer wind spring in the lifting support disclosed in the present disclosure, the number of wind springs arranged is greatly reduced, while the supporting force is kept unchanged, and therefore the sliding chute space used for accommodating the wind springs is effectively reduced. Since the sliding chute space is usually arranged inside the stand column, it is possible to achieve a thinner stand column, or a higher supporting strength of the stand column in the case where the requirement for the sliding chute space is reduced.

BRIEF DESCRIPTION OF DRAWINGS

In order to more clearly illustrate technical solutions of specific embodiments of the present disclosure or of the prior art, drawings required to be used in the description of the specific embodiments or the prior art will be introduced briefly below. It is obvious that the drawings in the following description are merely illustrative of some embodiments of the present disclosure. It would be understood by those of ordinary skill in the art that other drawings could also be obtained from these drawings without using any inventive effort.

REFERENCE NUMERALS

1—fastening connector, 10—elastic metal sheet, 11—stretching connection portion, 12—movable sheet portion, 13—unmovable wound portion, 14—semi-restricted structure, 15—round connection hole, 16—through hole, 101—outer-layer elastic metal sheet, 102—inner-layer elastic metal sheet, 20—rivet, 30—lubricating oil, 40—rotary drum, δ—movement allowance, 17—hook, 2—stand column, 3—lifting seat.

DETAILED DESCRIPTION OF EMBODIMENTS

The technical solutions of the present disclosure will be clearly and completely described below with reference to the drawings. It is apparent that the embodiments to be described are some, but not all of the embodiments of the present disclosure. All the other embodiments obtained by those of ordinary skill in the art in light of the embodiments of the present disclosure without inventive efforts would fall within the scope of the present disclosure as claimed.

In the description of the present disclosure, it should be noted that orientation or positional relations indicated by the terms such as "center", "up", "down", "left", "right", "vertical", "horizontal", "inner", and "outer" are the orientation or positional relations shown based on the figures, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, the terms "first", "second", and "third" are used for descriptive purpose only, and should not be understood as an indication or implication of relative importance.

In the description of the present disclosure, it should be noted that unless otherwise expressly specified or defined, terms "mount", "connect with", and "connect" should be understood in a broad sense. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure could be understood by those of ordinary skill in the art according to specific situations.

The present disclosure will be further explained and described below in connection with specific embodiments.

Embodiment 1

Figure 1:
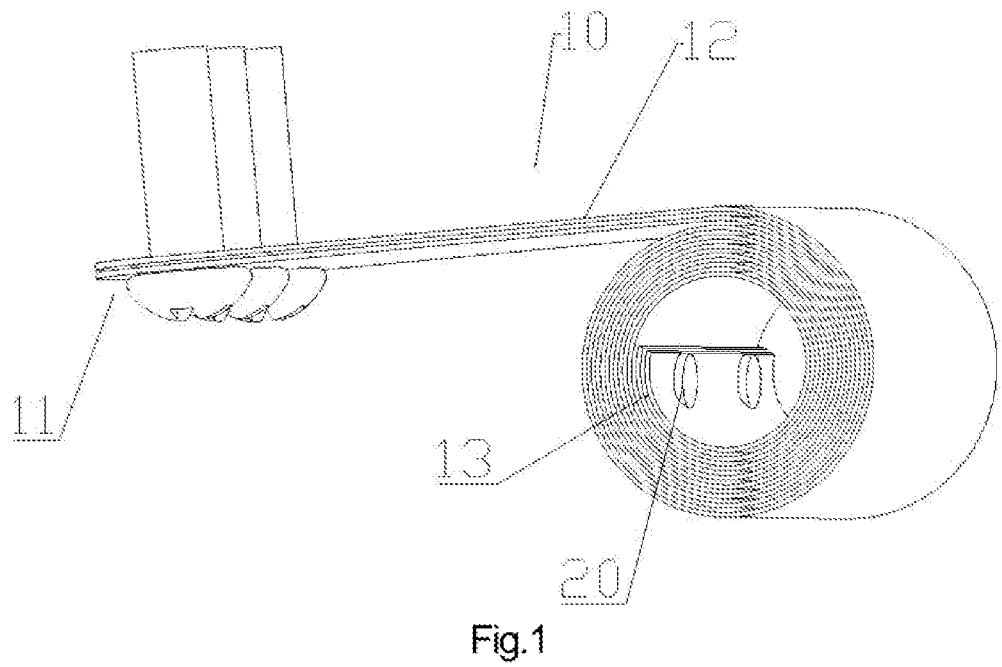
FIG. 1 is a schematic structural view of a multilayer wind spring provided by Embodiment 1 of the present disclosure.
Figure 2:
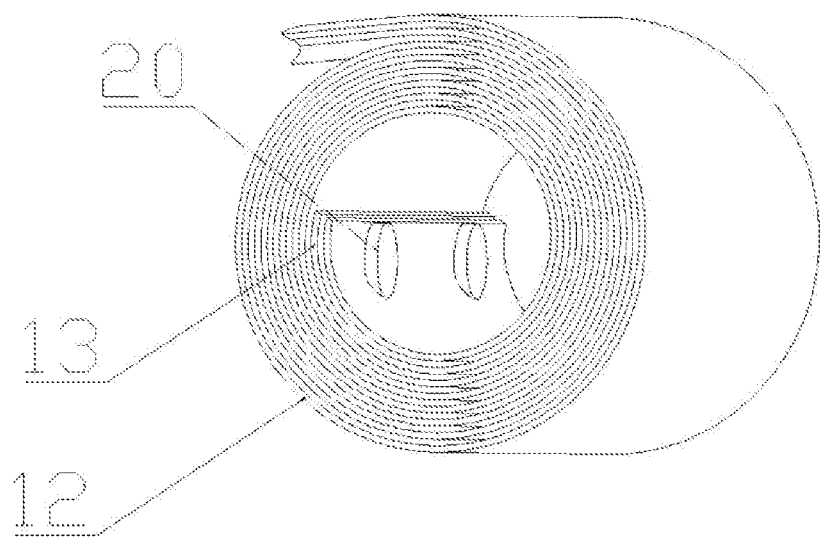
FIG. 2 is a partial schematic view of a wound cylindrical portion of the multilayer wind spring provided by Embodiment 1 of the present disclosure.

As shown in FIG. 1 and FIG. 2, the present embodiment provides a multilayer wind spring for a display support. The multilayer wind spring is formed by tightly attaching and winding a plurality of elastic metal sheets 10, each of the elastic metal sheet 10 comprises: a stretching connection portion 11 which is not involved in winding and unwinding and is always kept in an initial state (the stretching connection portion 11 is an outwardly extending portion of an outermost layer or an outermost turn of the wound portion of the elastic metal sheet 10 after the multilayer wind spring is wound up to an extreme position), a movable sheet portion 12 which is involved in winding and unwinding, and an unmovable wound portion 13 which is not involved in stretching and is always kept in a wound state (the unmovable wound portion 13 is usually wound for not less than one turn, and for less than one turn in particular situations, the stretching connection portion 11, the movable sheet portion 12, and the unmovable wound portion 13 are sequentially arranged in an unwinding direction, the plurality of elastic metal sheets 10 of the unmovable wound portions 13 are fixedly arranged relative to one another.

During use of a multi-sheet type wind spring formed by stacking and winding a plurality of elastic metal sheets 10 together, the arching phenomenon of the elastic metal sheet 10 frequently occurs. Those skilled in the art have been plagued by this technical problem for many years.

The applicant has discovered through long-term study that the reason for the arching is the dislocation between the elastic metal sheets 10 during the unwinding process, and when the elastic metal sheets 10 are wound up, the wound shape of the wound portion severely hinders the elastic metal sheets 10 from returning to the state before dislocation, so that the arched wind spring cannot be normally used.

In the present disclosure, the unmovable wound portions 13 of the plurality of elastic metal sheets 10 are fixedly arranged relative to one another, so as to effectively avoid dislocation between the plurality of elastic metal sheets 10 of the winding reel portion of the multilayer wind spring, thereby effectively solving the arching phenomenon of the wind spring, and thereby greatly prolonging the service life of the multilayer wind spring, which makes it possible to popularize and apply the multilayer wind spring.

In other words, the fully unwound elastic metal sheet 10 comprises a wound end at the side of the unmovable wound portion, and the wound ends of two adjacent elastic metal sheets 10 are fixed relative to each other.

In general, the multilayer wind spring is formed by tightly attaching and winding 2 to 5 elastic metal sheets 10. More preferably, the wind spring is formed by tightly attaching and winding 2 to 3 elastic metal sheets 10.

Specifically, the wound ends of the plurality of elastic metal sheets 10, that is, the unmovable wound portions 13 of the plurality of elastic metal sheets 10, are fixedly connected by a rivet(s) 20.

Of course, they may also be fixedly connected by using other means such as a screw, a buckle, bundling, welding or bonding.

Figure 3:
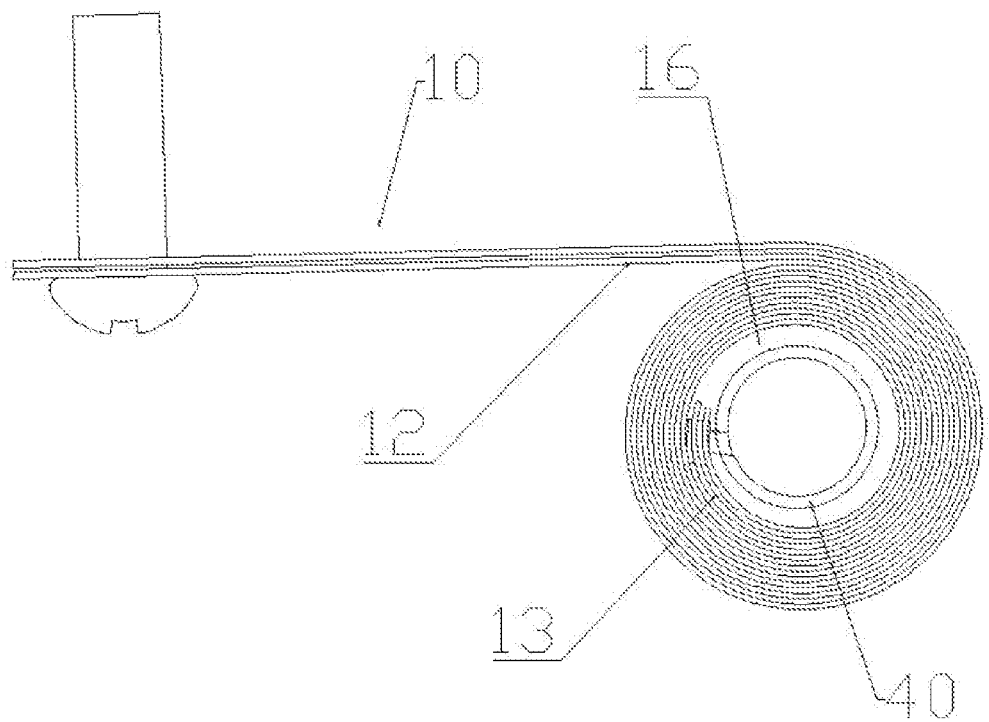
FIG. 3 is a schematic structural view of another implementation of a multilayer wind spring provided by Embodiment 1 of the present disclosure.

Alternatively, as shown in FIG. 3, a through hole 16 is provided in the middle of the unmovable wound portion 13.

A rotary drum 40 is inserted into the through hole 16, the rotary drum 40 is rotatably sleeved on a rotating shaft, and the plurality of elastic metal sheets 10 are fixedly connected with the rotary drum 40.

Specifically, the unmovable wound portion 13 of the elastic metal sheet 10 is fixedly connected to the rotary drum 40 by means of a screw, a pin, a rivet or the like. The unmovable wound portion 13 (otherwise referred to as the winding reel portion of the multilayer wind spring) is rotatably disposed on the rotating shaft via the rotary drum 40, and the rotating shaft is then disposed across a connected component such as a holder, a support or the like.

No lubricating oil is applied between two adjacent elastic metal sheets 10.

Figure 4:
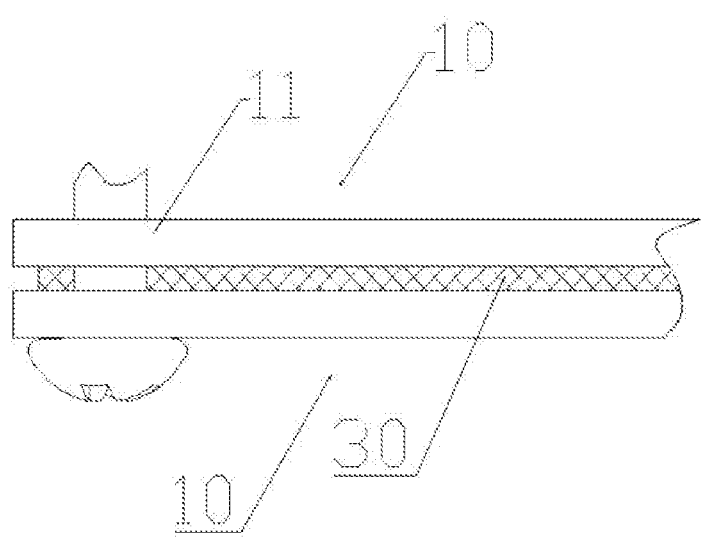
FIG. 4 is a schematic structural view of a multilayer wind spring in the prior art when a lubricating oil is applied to a stretching portion thereof.

As shown in FIG. 4, in the prior art, it is necessary to apply lubricating oil 30 between two adjacent elastic metal sheets 10, so as to avoid the arching phenomenon to the greatest extent for a long period of time during the use of the multilayer wind spring. The process of manufacturing the multilayer wind spring comprises making elastic metal sheets by roll forming and heat treatment, and finally combining the multiple elastic metal sheets 10 into a multilayer wind spring by a spring-combining machine. Since the applied lubricating oil 30 is washed away during the heat treatment, the lubricating oil must be applied during the spring-combining process. However, since the elastic metal sheets have all been formed by pressing at this moment, the oil application procedure is complicated with low efficiency.

In contrast, in the present disclosure, the occurrence of the arching phenomenon is effectively avoided by the arrangement described above, whereby it is possible that no lubricating oil is applied between the elastic metal sheets 10. Accordingly, the multiple elastic metal sheets 10 can be stacked together and simultaneously subjected to rolling forming and heat treatment, which no longer requires the spring-combining procedure while omitting the complicated oil application procedure, thereby greatly improving the production efficiency.

In the above, the elastic metal sheet 10 is a metal sheet having uniform thickness and consistent width for making a constant force spring.

A multilayer wind spring provided by the present disclosure has a simple structure and provides a stronger supporting force, and the present disclosure occupies smaller space while providing the same supporting force. In the present disclosure, the plurality of elastic metal sheets 10 are fixedly connected to one other at corresponding parts of the unmovable wound portions 13, so as to effectively avoid dislocation between the plurality of elastic metal sheets 10 of the winding reel portion of the wind spring, thereby effectively solving the arching phenomenon of the wind spring, and thereby greatly prolonging the service life of the multilayer wind spring, which makes it possible to popularize and apply the multilayer wind spring.

Embodiment 2

Figure 5:
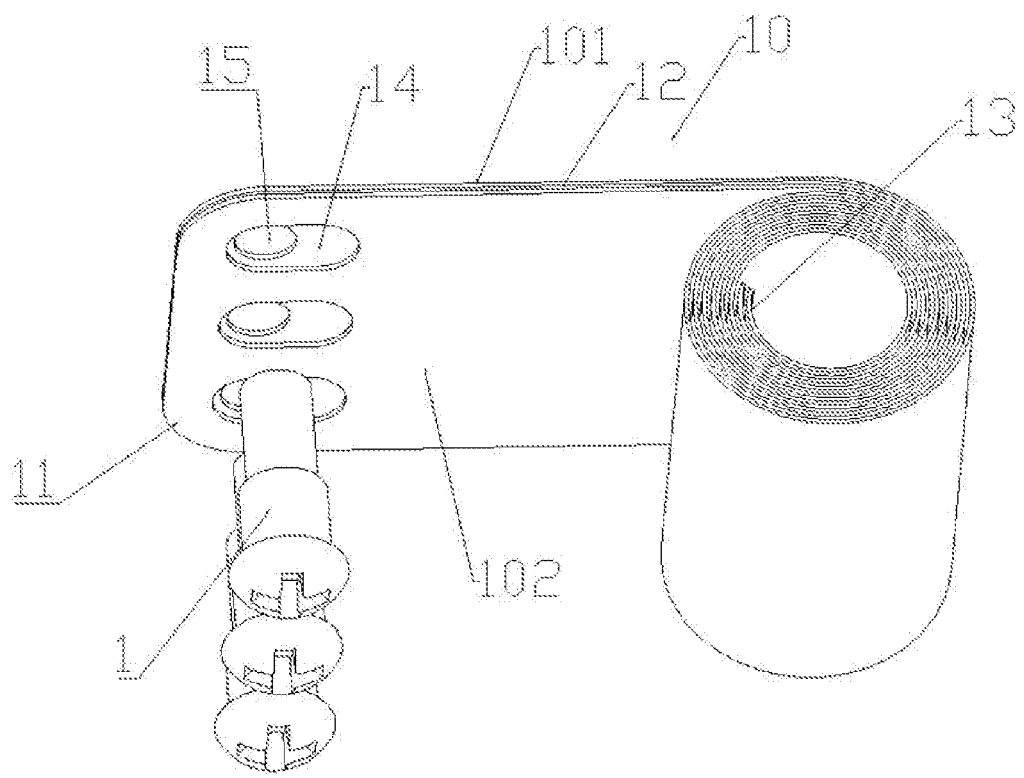
FIG. 5 is a schematic structural view of a multilayer wind spring provided by Embodiment 2 of the present disclosure.

The structure of the present embodiment is basically the same as that of the first embodiment, except that:

as shown in FIG. 5, the stretching connection portion 11 of the elastic metal sheet 10 is provided with a connection structure used for connection with a connected component, the connection structure of some or all of the elastic metal sheets 10 (inner-layer elastic metal sheets 102 in the present embodiment) is a semi-restricted structure 14.

Figure 6:
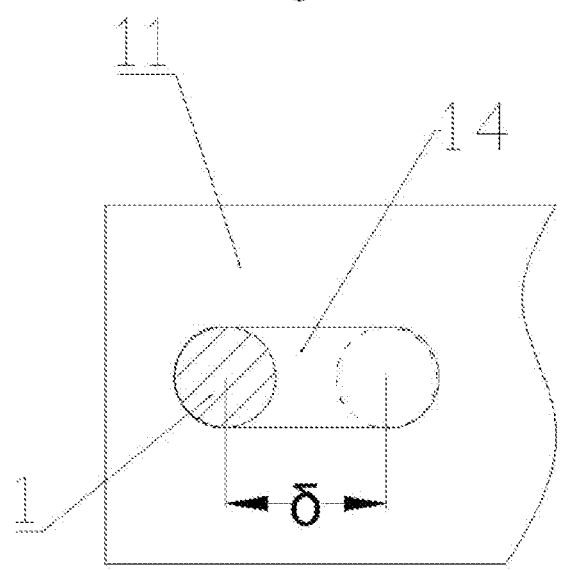
FIG. 6 is a partial schematic view of a semi-restricted structure of the multilayer wind spring provided according to the second embodiment of the present disclosure.
Figure 7:
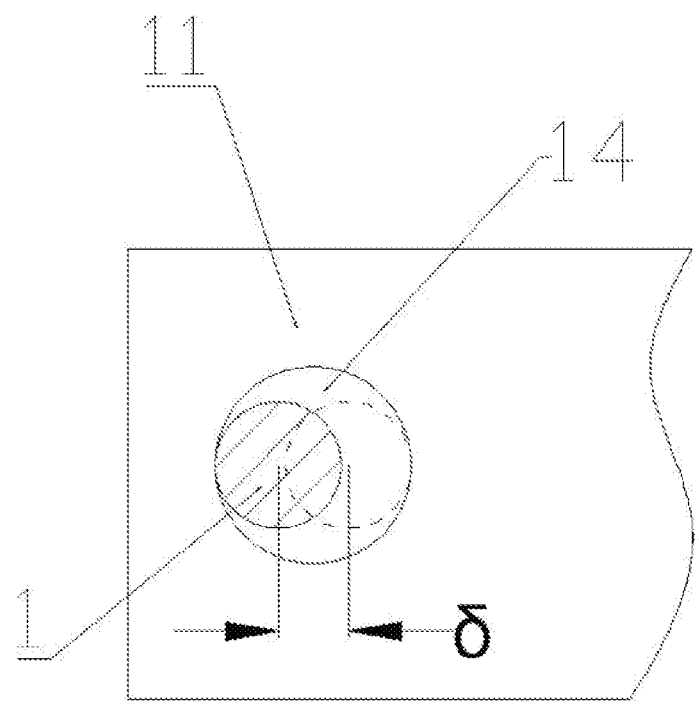
FIG. 7 is a schematic structural view of another implementation of the semi-restricted structure of the multilayer wind spring provided by Embodiment 2 of the present disclosure.

As shown in FIG. 6 and FIG. 7, the semi-restricted structure 14 is provided to have a movement allowance δ in an unwinding or winding-up direction of the elastic metal sheets 10, and during an unwinding or winding process of the multilayer wind spring, the stretching connection portion 11 of the elastic metal sheet 10 provided with the semi-restricted structure 14 is arranged to be slidable within the range of the movement allowance δ relative to the connected component.

When in use, after the stretching connection portions 11 of the multilayer wind spring are connected via the connection structure, the stretching connection portions 11 of some or all of the elastic metal sheets 10 are arranged to be slidable relative to each other in the unwinding or winding direction.

In the above, the number of the elastic metal sheets is set to be n, where n is a natural number greater than zero. The number of elastic metal sheets 10 provided with the semi-restricted structure 14 is preferably in the range of 1 to n−1. That is, a connection structure of retaining one elastic metal sheet 10 is not a semi-restricted structure 14, and the stretching connection portion of this elastic metal sheet is fixedly connected with the connected component.

Specifically, the plurality of elastic metal sheets 10 are divided into an outer-layer elastic metal sheet 101 disposed at the outermost side, and one or more inner-layer elastic metal sheets 102 wrapped by the outer-layer metal sheet, the inner-layer elastic metal sheet 102 is provided with the semi-restricted structure, and the stretching connection portion 11 of the outer-layer elastic metal sheet 101 is fixedly connected with the connected component.

That is, the connection structure of the stretching connection portion 11 of the outer-layer elastic metal sheet 101 is a round connection hole 15, the stretching connection portion 11 of the outer-layer elastic metal sheet 101 is fixedly connected with the connected component, and the connection structure of the inner-layer elastic metal sheet 102 is the semi-restricted structure 14.

For the winding reel portion (or the unmovable wound portion 13) of the multilayer wind spring, the outer-layer elastic metal sheet 101 is the outermost elastic metal sheet 10, and for the stretching connection portion 11 of the multilayer wind spring, the outermost side is the side most distant from the unmovable wound portion 13, and when the stretching connection portion 11 is disposed horizontally, the winding reel portion (or the unmovable wound portion 13)

is at a higher position, then the outer-layer elastic metal sheet 101 refers to an elastic metal sheet 10 disposed at the lowest position.

As shown in FIG. 6, the semi-restricted structure 14 is an elongated hole (a kidney-shaped hole or an obround hole) or an elongated slot, the elongated hole or the elongated slot is arranged in the unwinding or winding-up direction of the elastic metal sheet 10, a fastening connector 1 such as a screw, a bolt or a rivet is inserted into the elongated hole or the elongated slot for connecting the stretching connection portion 11 to the connected component, and after the fastening connector 1 is inserted into the elongated hole or the elongated slot, a gap which serves as the movement allowance δ is present between the fastening connector 1 and the elongated hole or the elongated slot, wherein the fastening connector does not completely press and lock the stretching connection portion, and the stretching connection portion is arranged to be slidable relative to the fastening connector.

As shown in FIG. 7, the semi-restricted structure 14 is a round connection hole, and the fastening connector 1 such as a screw, a bolt or a rivet is inserted into the connection hole for connecting the stretching connection portion 11 to the connected component. After the fastening connector 1 is inserted into the connection hole, the hole diameter of the connection hole is larger than the outer diameter of the fastening connector 1, and therefore a gap which serves as the movement allowance δ is present between the fastening connector 1 and the round connection hole. The movement allowance δ is the difference between the hole diameter of the connection hole and the outer diameter of the fastening connector. Here, the fastening connector does not completely press and lock the stretching connection portion, and the stretching connection portion is arranged to be slidable relative to the fastening connector.

In the above, the movement allowance δ is 0.5 to 5 mm, more preferably 0.6 to 2 mm.

That is, the length of the elongated hole or the elongated slot is 0.5 to 5 mm larger than the outer diameter of the fastening connector 1, and when the semi-restricted structure 14 is a connection hole, the hole diameter of the connection hole is 0.5 to 5 mm larger than the outer diameter of the fastening connector 1.

In the above, the elongated hole or the elongated slot is used for disposing the stretching connection portion 11 of the multilayer wind spring on the stand column 2 or the lifting seat 3 of the lifting support.

Preferably, the elongated hole is an obround kidney-shaped hole. When a certain elastic metal sheet 10 tends to arch due to dislocation during use, the stretching connection portion 11 of this elastic metal sheet 10 freely stretches and retracts within the range of the movement allowance δ via the semi-restricted structure 14 such as an elongated hole or an elongated slot, so as to eliminate the stress that causes the arching of the elastic metal sheet 10, and prevent the elastic metal sheet 10 from arching, thereby further ensuring the service life of the multilayer wind spring.

Figure 8:
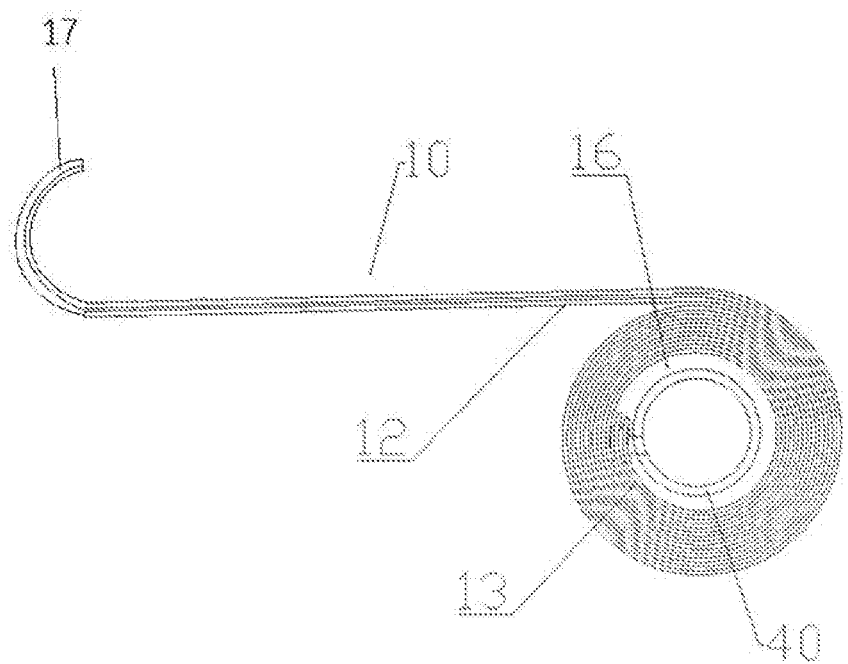
FIG. 8 is a schematic structural view of another embodiment of the semi-restricted structure of the present disclosure.

As shown in FIG. 8, another implementation of the semi-restricted structure is as follows: the ends of the stretching connection portions 11 of n elastic metal sheets 10 are bent towards the opposite side of the unmovable wound portion 13 to form a hook 17 used as a connection structure, and the hook 17 and the unmovable wound portion 13 have an S shape, and the hook 17 is hooked onto the connected component, and the hook 17 of from the 2$^{nd}$ metal sheet to the n$^{th}$ metal sheet can move unidirectionally in a stretching direction away from the unmovable wound portion 13.

The movement allowance δ is calculated as follows:
the thickness of the elastic metal sheet is h, after the movable sheet portion 12 is wholly wound up and wound around the outer side of the unmovable wound portion 13, the maximum number of wound turns of the movable sheet portion 12 of the elastic metal sheet is m, and the movement allowance δ of the j$^{th}$ metal sheet is 2π mh±0.5 mm, wherein $h>0$, $m>0$, $2 \leq j \leq n$.

In the winding and unwinding processes, the elastic metal sheet 10 at a different turn displaces or arches at a different degree. In order to ensure that each elastic metal sheet 10 can be fully unwound to eliminate all the stresses which cause arching, it should be met that the movement allowance δ is 2π mh±0.5 mm, that is, after a fastener such as a screw runs through the semi-restricted structure 14 such as an elongated hole or an elongated slot, the semi-restricted structure 14 at least retains a movement allowance δ of 2π mh±0.5 mm.

A long strip shaped, elongated hole or elongated slot, or a U-shaped opening is provided on the stretching connection portion 11 of the elastic metal sheet 10 and is disposed in the unwinding direction of the elastic metal sheet 10, so that when a certain elastic metal sheet 10 tends to arch due to dislocation during use, the stretching connection portion 11 of this elastic metal sheet 10 freely stretches and retracts via the elongated hole, the elongated slot or the U-shaped opening, so as to eliminate the stress that causes the arching of the elastic metal sheet 10, and prevent the elastic metal sheet 10 from arching, thereby further ensuring the service life of the multilayer wind spring.

Embodiment 3

Figure 9:
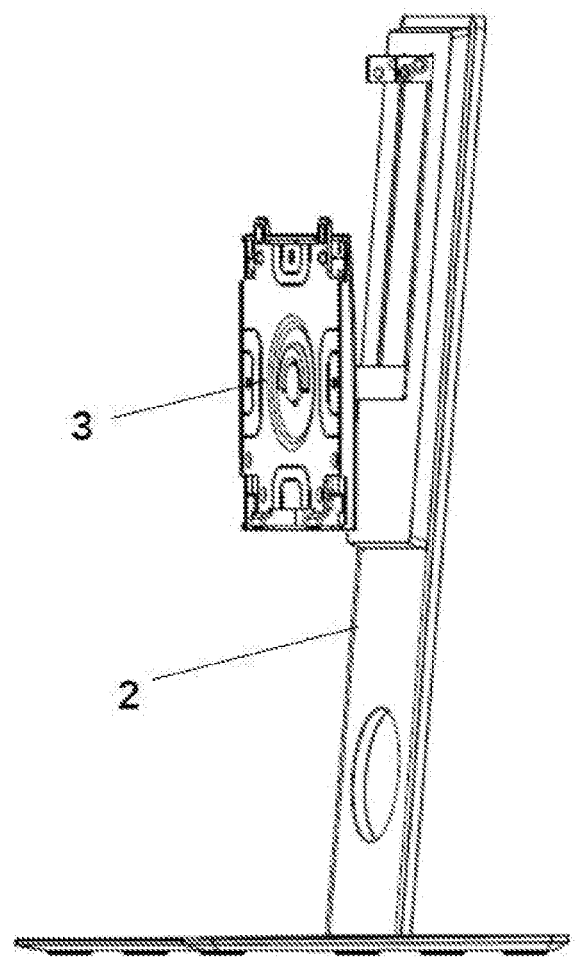
FIG. 9 is a schematic structural view of a lifting support having a multilayer wind spring of the present disclosure.

As shown in FIG. 1 and FIG. 9, the present embodiment discloses a lifting support having the above-mentioned multilayer wind spring, which comprises a stand column 2 and a lifting seat 3, wherein, the lifting seat 3 is disposed on the stand column 2 in such a manner that it is slidable up and down, the stretching connection portion 11 of the multilayer wind spring is connected to the lifting seat 3 or the stand column 2, the stretching connection portion 11 of the elastic metal sheet 10 provided with the semi-restricted structure 14 is arranged to be slidable within the range of the movement allowance relative to the lifting seat 3 or the stand column 2, the unmovable wound portion 13 of the multilayer wind spring is rotatably disposed on the stand column 2 or the lifting seat, and the multilayer wind spring tends to force the lifting seat 3 to move upwards, thereby providing a supporting force for supporting the lifting seat 3.

The unmovable wound portion 13 of the multilayer wind spring is rotatably disposed on the stand column 2 or the lifting seat 3 via a rotary drum or a semi-wrapped spring base for constant force spring.

The lifting support is a display screen support, and a display screen is disposed on the lifting seat 3.

By using a multilayer wind spring in the lifting support disclosed in the present disclosure, the number of wind springs arranged is greatly reduced, while the supporting force is kept unchanged, and therefore the sliding chute space used for accommodating the wind springs is effectively reduced. Since the sliding chute space is usually arranged inside the stand column, it is possible to achieve a thinner stand column 2, or a higher supporting strength of the stand column 2 in the case where the requirement for the sliding chute space is reduced.

Finally, it should be noted that the above embodiments are only used to illustrate, rather than limit, the technical solutions of the present disclosure, although the present disclosure has been described in detail in connection with the above embodiments, it should be understood by those of ordinary skill in the art that the technical solutions described in the foregoing embodiments can still be modified, or equivalent substitution can be made to some or all of the technical features therein, and the modification or substitution would not cause the substance of the corresponding technical solutions to depart from the scope of the technical solutions of the embodiments of the present disclosure.

The invention claimed is:

1. A multilayer wind spring for a display support, being formed by tightly attaching and winding multiple elastic metal sheets,
    wherein each of the multiple elastic metal sheets comprises: a stretching connection portion which is not involved in winding and unwinding and is always kept in an initial state, a movable sheet portion which is involved in winding and unwinding, and an unmovable wound portion which is not involved in stretching and is always kept in a wound state,
    the stretching connection portion, the movable sheet portion, and the unmovable wound portion are formed integrally and sequentially arranged in an unwinding direction,
    all the multiple elastic metal sheets of the unmovable wound portions are fixedly arranged relative to one another.

2. The multilayer wind spring for a display support according to claim 1, being formed by tightly attaching and winding 2 to 7 elastic metal sheets.

3. The multilayer wind spring for a display support according to claim 1, wherein the unmovable wound portion is wound for 3 to 10 turns.

4. The multilayer wind spring for a display support according to claim 1, wherein the multiple elastic metal sheets of the unmovable unwound portions are fixedly connected together by means of a rivet, a screw, a buckle, a pin, a mortise-tenon structure, bundling, welding or bonding.

5. The multilayer wind spring for a display support according to claim 1, wherein a through hole is provided in the middle of the unmovable wound portion,
    a rotary drum is inserted into the through hole, the rotary drum is rotatably sleeved on a rotating shaft, and the unmovable wound portion of each of the multiple elastic metal sheets is fixedly connected with the rotary drum.

6. The multilayer wind spring for a display support according to claim 1, wherein the stretching connection portion is provided with a semi-restricted structure used for connection with a connected component, the semi-restricted structure is provided to have a movement allowance in an unwinding or winding-up direction of the multiple elastic metal sheets, and during an unwinding or winding process of the multilayer wind spring, the stretching connection portion of each of the multiple elastic metal sheets provided with the semi-restricted structure is arranged to be slidable relative to the connected component within a range of the movement allowance.

7. The multilayer wind spring for a display support according to claim 6, wherein a fastening connector for connecting the stretching connection portion to the connected component is inserted into the semi-restricted structure, and the fastening connector and the semi-restricted structure are provided to have the movement allowance therebetween,
    wherein the fastening connector does not completely press and lock the stretching connection portion, and the stretching connection portion is arranged to be slidable relative to the fastening connector.

8. The multilayer wind spring for a display support according to claim 6, wherein the semi-restricted structure is an elongated hole or an elongated slot or a round hole, and the elongated hole or the elongated slot has its length direction arranged in the unwinding or winding-up direction of each of the multiple elastic metal sheets.

9. The multilayer wind spring for a display support according to claim 1, wherein the multiple elastic metal sheets are divided into an outer-layer elastic metal sheet disposed at the outermost side and an inner-layer elastic metal sheet wrapped by the outer-layer elastic metal sheet, the inner-layer elastic metal sheet is provided with the semi-restricted structure, and the stretching connection portion of the outer-layer elastic metal sheet is fixedly connected with the connected component.

10. The multilayer wind spring for a display support according to claim 1, wherein the stretching connection portion is fixedly connected with the connected component.

11. A lifting support having the multilayer wind spring for a display support according to claim 1, comprising a stand column and a lifting seat,
    wherein the lifting seat is disposed on the stand column in such a manner that it is slidable up and down.

12. A lifting support having the multilayer wind spring for a display support according to claim 3, comprising a stand column and a lifting seat,
    wherein the lifting seat being disposed on the stand column in such a manner that it is slidable up and down.

* * * * *